Patented Apr. 25, 1944

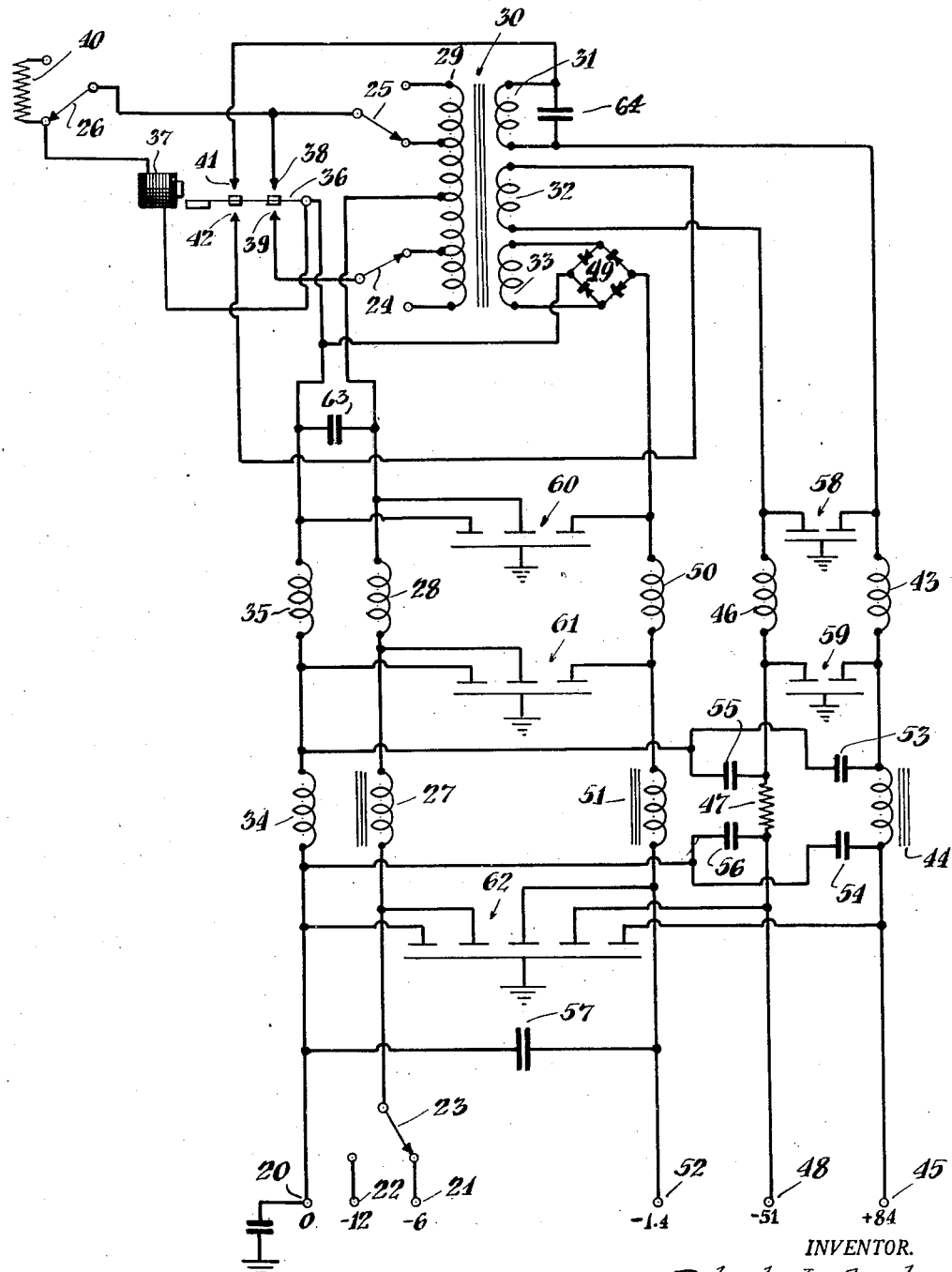

2,347,165

UNITED STATES PATENT OFFICE 2,347,165

VIBRATOR OPERATED POWER SUPPLY

Robert J. Aust, Indianapolis, Ind., assignor to P. R. Mallory & Co., Inc., Indianapolis, Ind., a corporation of Delaware Application May 29, 1942, Serial No. 445,021

3 Claims. (Cl. 171—97)

This invention relates to electric power supply systems utilizing electromagnetic vibratory interrupters.

An object of the invention is to improve power supply systems.

A further object is to provide a power supply system for supplying electric energy at two or more voltages from a power supply source.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

The figure of the drawing is a circuit diagram of a power supply system embodying features of the present invention.

It is sometimes necessary to have a power supply for radio sets, signaling devices and other electric and electronic apparatus which is supplied with energy from a low voltage source, such as a battery. In some cases energy at two or more different voltages is required. The combination of an electromagnetic vibratory interrupter, commonly known as a vibrator, with a set-up transformer affords a convenient portable power supply system for such purposes. However, where two or more voltages are required, it has not heretofore been convenient to obtain them from a single power supply system without the use of specially constructed split reed vibrators having duplicate parts for supplying the two voltages or without the use of separate rectifying tubes which themselves require considerable operating power and add to the expense and size of the power supply equipment.

A feature of the present invention resides in the use of a single standard self-rectifying vibrator, together with a transformer having at least two secondary windings connected respectively to individual rectifying contacts of the vibrator to obtain at least two separate output voltages.

Referring to the drawing, the power supply system is adapted for connection to either a 6 volt or a 12 volt energy source, such as a battery. Terminals 20 and 21 are used to connect the system to a 6 volt source and terminals 20 and 21 are used when a 12 volt battery furnishes the power. A two position switch having movable contact arms 23, 24, 25 and 26 is used to change the circuit connections from 6 volt to 12 volt battery supply. In the positions shown the system is adapted for a 6 volt battery supply. The negative terminal of the battery is connected through switch arm 23 and filter inductances 27 and 28 to the mid-point of the primary winding 29 of the power supply transformer 30. The transformer is provided with three secondary windings 31, 32 and 33.

The positive terminal of the battery, which may be at ground potential, is connected through filter inductances 34 and 35 to the vibratory reed 36 of the vibrator. Reed 36 is vibrated by electromagnet 37 of the vibrator when it is connected to the battery to alternately close primary circuit contacts 38 and 39 which are positioned on opposite sides of the reed to cooperate with contacts carried by the reed.

A second pair of stationary contacts 41 and 42 are also positioned on opposite sides of the reed to cooperate therewith and are connected, respectively, to secondary windings 31 and 32 of the transformer. The remaining terminal of secondary winding 31 is connected through filter inductances 43 and 44 to one high voltage output terminal 35 of the power supply system. The remaining terminal of secondary winding 32 is connected through inductances 46 and 47 to the other high voltage output terminal 48 of the system.

The third secondary winding 33 supplies low voltage power through full-wave dry-disc rectifier 49 through inductances 50 and 51 to low voltage output terminal 52.

To provide for 12 volt battery operation, a resistance 40 is connected in series with vibrator electromagnet winding 37 by switch 26 when it is moved to the 12 volt position. Each half of the primary winding 29 of the transformer is provided with a tap terminal with which switch contacts 24 and 25 make contact in the 6 volt battery position. For 12 volt operation switch contacts 24 and 25 connect the full primary winding into the circuit. The resistance and turn ratio of the individual sections of the primary winding is adjusted to provide the same transformer output voltages in either the 6 volt or the 12 volt position.

In operation, when the battery is connected to the input terminals, a circuit is completed for the energization of vibrator electromagnet 37, which is of high resistance, from the negative terminal of the battery through the center tap of transformer primary 29, the upper portion of the primary winding and switch contacts 25 and 26. Since winding 37 is of high resistance only a small current flows through the transformer at this time. The current is sufficient, however, to start operation of the vibrator and reed 36 swings into contact with contacts 38 and 41. When the reed engages contact 38 it completes a shunt circuit around magnet 37, thus de-energizing it and also permitting a much increased current to flow through the upper half of the transformer primary, inducing a voltage across each of the secondary windings. The closing of contact 41 at the same time completes the circuit for secondary winding 31 from ground terminal 20 through reed 36 and contact 41.

These contacts are closed only momentarily, after which the reed swings back past center position and engages opposite contacts 39 and 42, thus completing a circuit through the lower half of primary 29 resulting in a reversal of current in the transformer. This produces a reversal of voltage across the transformer secondary windings. However, the reed has now disconnected winding 31 and completed a circuit for winding 32 from ground through the reed 36 and contact 42. The opening of contact 38 has also caused electromagnet 37 to be re-energized. Therefore, the reed is again drawn upward to repeat the cycle.

As vibration continues in this manner it will be noted that the circuit of secondary winding 31 is closed only when current is flowing in the upper half of the transformer primary winding and secondary 32 has its circuit completed when the current is flowing in the opposite direction through the lower half of the primary winding and hence is inducing a voltage of the opposite polarity across the secondary windings. The reed, therefore, acts as a half-wave rectifier for each individual winding. The output terminals 45 and 48 are connected to secondary windings 31 and 32 so that the polarity at the output terminals is positive for terminal 45 and negative for terminal 48. It is, of course, possible, to connect both secondary windings to provide similar polarities for both output terminals. In the circuit illustrated secondary winding 31 is provided with sufficient turns to produce an output voltage of +84 volts at terminal 45, and winding 32 provides an output voltage of −51 volts at terminal 48. Secondary winding 33 supplies an output voltage of −1.4 volts through rectifier 49.

Condensers 53, 54, 55, 56, 63 and 57 are current storage condensers to provide smooth and constant output current from the system. Condensers 58 and 59 serve to reduce the amount of electrical noise or "hash" in the output circuit. Condensers 60, 61 and 62 are radio frequency filter condensers. Condenser 64 is a secondary buffer condenser.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A power supply system having a common output terminal and two independent output terminals comprising a transformer having a primary and two secondary windings, a vibrator comprising an electromagnet, a vibratory contact vibrated thereby and at least two stationary contacts engaged by said vibratory contact at each extreme of its travel, and a D. C. source connected between said vibratory contact and the center of said primary winding, one of said stationary contacts on each side of said vibrator being connected to the ends of said primary winding, the remaining two stationary contacts being connected respectively to the ends of said secondary windings, the remaining ends of said secondary windings being connected to said independent output terminals respectively, and said common output terminal being connected to said vibratory contact.

2. A vibrator power supply system comprising a D. C. source, a transformer having a primary and two independent secondary windings and a vibrator to connect said D. C. source to supply current to said primary winding in first one direction and then the other whereby alternating voltages are induced across said secondary windings, and two contacts on said vibrator and cooperating with the vibratory contact thereof in series with said two secondary windings respectively, said vibratory contact engaging one of said contacts when said D. C. source is connected to supply current to said primary in one direction and the other of said contacts when said D. C. source supplies current to said primary in the opposite direction, whereby the output current of both of said secondary windings is rectified, and three output terminals connected respectively to said vibratory contact and to said secondary windings.

3. A vibrator power supply system comprising a transformer having a primary winding and two independent secondary windings, said windings differing from each other in number of turns, a D. C. source, and a vibrator for connecting said D. C. source to supply current alternately in opposite directions to said primary to thereby induce an alternating potential difference across each of said secondary windings, two pairs of cooperating contacts alternately closed by said vibrator in substantial synchronism with the reversals of potential difference in said secondary windings whereby one contact pair is closed where the potential difference is induced in one direction and the other pair is closed when the potential difference is in the opposite direction, and two independent power output circuits, each of said output circuits comprising a series arrangement of one of said secondary windings with one of said contact pairs, whereby said output circuits will supply unidirectional output current of two different voltages.

ROBERT J. AUST.